(12) United States Patent
Holly

(10) Patent No.: US 11,815,007 B2
(45) Date of Patent: *Nov. 14, 2023

(54) PRE-CHAMBER SPARK PLUG FOR A COMBUSTION CHAMBER OF AN INTERNAL COMBUSTION ENGINE, INTERNAL COMBUSTION ENGINE AND MOTOR VEHICLE

(71) Applicant: Mercedes-Benz Group AG, Stuttgart (DE)

(72) Inventor: Werner Holly, Merklingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/907,922

(22) PCT Filed: Feb. 17, 2021

(86) PCT No.: PCT/EP2021/053802
§ 371 (c)(1),
(2) Date: Aug. 29, 2022

(87) PCT Pub. No.: WO2021/175584
PCT Pub. Date: Sep. 10, 2021

(65) Prior Publication Data
US 2023/0097104 A1    Mar. 30, 2023

(30) Foreign Application Priority Data
Mar. 4, 2020  (DE) .................... 10 2020 001 381.3

(51) Int. Cl.
*F02B 19/12* (2006.01)
*F02B 19/18* (2006.01)

(52) U.S. Cl.
CPC .............. *F02B 19/12* (2013.01); *F02B 19/18* (2013.01)

(58) Field of Classification Search
CPC .......... F02B 19/18; F02B 19/12; F02B 19/08; F02B 19/1019; F02B 19/1023; F02B 19/1014
See application file for complete search history.

(56) References Cited

U.S. PATENT DOCUMENTS 10,378,428 B2    8/2019  Muto
2013/0055986 A1  3/2013  Tozzi et al.
(Continued)

FOREIGN PATENT DOCUMENTS

DE    10 2010 003 899 A1   10/2011
DE    10 2018 106 213 A1    9/2018
(Continued)

OTHER PUBLICATIONS

PCT/EP2021/053802, International Search Report dated May 14, 2021 (Two (2) pages).
(Continued)

*Primary Examiner* — Xiao En Mo
(74) *Attorney, Agent, or Firm* — Crowell & Moring LLP

(57) ABSTRACT

A pre-chamber spark plug for a combustion chamber of an internal combustion engine includes a pre-chamber which has a plurality of openings and which is fluidically connectable to the combustion chamber via the plurality of openings. A fuel/air mixture is introducible from the combustion chamber into the pre-chamber via the plurality of openings. Each of the plurality of openings has a respective flow cross section through which the fuel/air mixture is flowable. With respect to an imaginary plane running along an imaginary axis of the pre-chamber and dividing the pre-chamber into a first half and a second half of equal size, a sum of the flow cross sections of first openings disposed in the first half is greater than a sum of the flow cross-sections of second openings disposed in the second half.

10 Claims, 2 Drawing Sheets

(56) References Cited

U.S. PATENT DOCUMENTS

2019/0048784 A1* 2/2019 Ashizawa ........... F02B 19/1023
2021/0348544 A1 11/2021 Holly

FOREIGN PATENT DOCUMENTS

| DE | 10 2018 117 726 A1 | 2/2019 |
| DE | 10 2018 007 093 A1 | 3/2020 |
| EP | 2 700 796 A1 | 2/2014 |
| JP | 2006-144648 A | 6/2006 |
| JP | 2012-211594 A | 11/2012 |

OTHER PUBLICATIONS

German-language German Office Action issued in German application No. 10 2020 001 384.8 dated Oct. 12, 2020 (Eight (8) pages).
U.S. Patent Application, "Pre-Chamber Spark Plug for a Combustion Chamber of an Internal Combustion Engine, Internal Combustion Engine, and Motor Vehicle", filed Sep. 2, 2022, Inventor: Werner Holly.
U.S. Patent Application, "Pre-Chamber Spark Plug for a Combustion Chamber of a Combustion Engine, Combustion Engine, and Motor Vehicle", filed Sep. 2, 2022, Inventor: Werner Holly.

* cited by examiner

PRE-CHAMBER SPARK PLUG FOR A COMBUSTION CHAMBER OF AN INTERNAL COMBUSTION ENGINE, INTERNAL COMBUSTION ENGINE AND MOTOR VEHICLE

BACKGROUND AND SUMMARY OF THE INVENTION

The invention relates to a pre-chamber spark plug for a combustion chamber of an internal combustion engine, in particular of a motor vehicle. Furthermore, the invention relates to an internal combustion engine for a motor vehicle. The invention also relates to a motor vehicle, in particular a motor car.

EP 2 700 796 A1 discloses a pre-combustion chamber tip of a pre-combustion chamber arrangement of an internal combustion engine. Furthermore, a pre-combustion chamber is known from US 2013/0055986 A1. DE 10 2018 117 726 A1 discloses an internal combustion engine, having a spark plug which has a spark generating part. A pre-chamber spark plug is known from JP 2012-211594 A. An internal combustion engine is known from DE 10 2018 106 213 A1, having a main combustion chamber arranged between a cylinder head and a piston that faces towards the cylinder head. Furthermore, DE 10 2018 007 093 A1 discloses a pre-chamber spark plug for a combustion chamber of an internal combustion engine.

The object of the present invention is to create a pre-chamber spark plug for a combustion chamber of an internal combustion engine, an internal combustion engine having at least one such pre-chamber spark plug and a motor vehicle, such that a particularly advantageous operation of the internal combustion engine can be implemented.

A first aspect of the invention relates to a pre-chamber spark plug for a combustion chamber of an internal combustion engine, in particular for a motor vehicle. The pre-chamber spark plug has a pre-chamber with a plurality of openings, for example in the form of through-openings, via which the pre-chamber can be fluidically connected to the combustion chamber. For example, the respective opening is formed as a bore. In particular, the opening can run straight or in a straight line, preferably over its entire extension. A fuel-air mixture, also referred to simply as a mixture, can be introduced from the combustion chamber into the pre-chamber via the respective opening. For example, at least one ignition spark can be generated in the pre-chamber. For this purpose, the pre-chamber spark plug comprises, for example, at least one electrode device which is arranged at least partially in the pre-chamber. By means of the electrode device, the aforementioned ignition spark can be generated in the pre-chamber. By means of the ignition spark, the fuel-air mixture that has flowed into the pre-chamber via the openings can be ignited or ignited and subsequently burned such that, for example, flames or burning flares resulting from the ignition of the mixture can flow out of the pre-chamber via the openings and enter the combustion chamber. Subsequently, the mixture remaining in the combustion chamber is ignited in the combustion chamber.

The respective opening here has a respective flow cross-section through which the fuel-air mixture or the respective flare can flow. The respective flow cross-section is thus a surface through which the mixture can flow or has a surface or an area and through which the mixture can flow.

In order to now be able to implement a particularly advantageous operation of the internal combustion engine, it is provided according to the invention that, with reference to an imaginary or virtual plane which runs along an imaginary axis and divides the pre-chamber into exactly two halves of equal size, first ones of the openings are arranged in a first of the halves and second ones of the openings in the second half. The axis is preferably a straight line. It is further provided that the sum of the flow cross-sections of the first openings arranged in the half is greater than the sum of the flow cross-sections of the second openings arranged in the second half. For example, the openings are arranged along an imaginary or virtual circle whose imaginary or virtual center lies on the imaginary or virtual axis, such that, for example, the openings are arranged one after the other around the axis along the circle. In particular, this can be understood to mean that the respective centers or geometric foci, in particular centroids, of the openings or the flow cross-sections are arranged on the imaginary circle and along the circle, in particular one after the other. For example, the imaginary plane divides the circle into two halves of equal size or into two parts of equal size or length, wherein, for example, a first of the halves of the circle is arranged, in particular completely, in the first half of the chamber, also referred to as the first chamber half, and wherein, for example, the second half of the circle is arranged, in particular completely, in the second half of the pre-chamber, also referred to as the second chamber half.

For example, the first openings arranged in the first half are arranged on the first half of the circle, while the second openings arranged in the second half are arranged on the second half of the circle. Preferably, the sum of the flow cross-sections of the openings arranged on the first half of the circle is greater than the sum of the flow cross-sections of the openings arranged on the second half of the circle.

Moreover, it is provided according to the invention that the openings around the axis, i.e., with respect to the axis, are formed asymmetrically in terms of rotation. This means, for example, that the openings around the axis and thus in the peripheral direction of the pre-chamber or the pre-chamber spark plug running around the axis are arranged asymmetrically, i.e., unevenly distributed. Alternatively or additionally, the feature that the openings are rotationally asymmetrical or formed around the axis can be understood to mean that at least two of the openings differ from one another in terms of their geometry, in particular in terms of the geometry of their respective flow cross-section, and thereby have a rotationally asymmetrical sequence, in particular around the axis. This means in particular that the flow cross-sections of these at least two openings differ from one another, in particular with regard to their size, i.e., area or surface area, wherein the at least two openings or preferably all openings have a rotationally asymmetrical sequence around the axis. This means, in particular, that the at least two openings or preferably all openings around the axis follow each other in a non-uniform or disordered manner, i.e., not according to a regular order. Furthermore, it is provided according to the invention that the flow cross-sections of at least two of the openings (16) differ from each other with regard to their shape.

Due to the different sums of the flow cross-sections, the openings can be caused or are formed to cause a tumble-shaped flow of the fuel-air mixture flowing into the pre-chamber via the openings. In other words, during fired operation of the internal combustion engine, the openings, in particular also due to their arrangement and/or their number and/or their geometry and, according to the invention, due to the fact that the sum of the or all flow cross-sections of the openings arranged in the first half is greater than the sum of the or all flow cross-sections of the openings arranged in the second half, bring about an at least substantially tumble-shaped flow of the fuel-air mixture, which is simply also referred to as a mixture and which flows through the opening and thereby flows out of the combustion chamber into the pre-chamber. Expressed again in other words, the openings, which are formed for example as through-openings, impart an at least substantially tumble-shaped and thus cylindrical flow, also referred to as tumble flow, on the mixture flowing through the openings and thus flowing out of the combustion chamber into the pre-chamber, such that particularly advantageous operation of the pre-chamber spark plug and thus of the internal combustion engine as a whole can be realized.

Since the sum of the flow cross-sections of the openings arranged in the first half is greater than the sum of the flow cross-sections of the openings arranged in the second half, it is provided according to the invention that the openings, for example in the form of bores, are formed to be rotationally asymmetrical with respect to the axis or around the axis. This rotationally asymmetrical design can comprise or include a respective positioning and/or the flow cross-section of the respective opening, which is also referred to as a cross-sectional area or has a cross-sectional area.

In contrast to a rotationally symmetrical arrangement of the openings around the axis and in contrast to a possibly resulting rotationally symmetrical flow, which for example extends helically or ring-like around a main axis or a longitudinal axis of the pre-chamber, the tumble-shaped flow is a cylindrical flow, which extends, for example, at least partially on a plane or runs on a plane on which the main axis lies. The aforementioned main axis or longitudinal axis can be the aforementioned imaginary axis.

The tumble-shaped flow, also known as the tumble flow, positively influences the combustion in the pre-chamber in several ways, whereby a particularly large working range can be realized in the pre-chamber. On the one hand, there is better flushing of the residual gas in the region of the spark plug gap, resulting in a more stable ignition. Compared to conventional spark plugs, there is a more favourable convection of the initial flame core in the direction of the openings, also called nozzles or formed as nozzles. Through better flushing and through the more favourable convection, a more combustion-favourable design of the electrode device of the spark plug, which is simply also referred to as an electrode, can be achieved, in particular with regard to a lower penetration depth of the electrode, which is for example formed as a ground electrode. This results in a smaller surface area, which in turn results in lower wall heat losses. This can reduce the tendency for pre-ignition compared to conventional pre-chamber spark plugs.

The aforementioned respective flow cross-section is to be understood, in particular, as the respective smallest or minimal flow cross-section or opening cross-section of the respective opening through which the mixture can flow. In conventional pre-chamber spark plugs, the openings, in particular due to their rotationally symmetrical arrangement, cause an at least substantially rotationally symmetrical flow of the mixture flowing through the opening and thus flowing from the combustion chamber into the pre-chamber. The disadvantage of this is that the initial flame core is not convected or is convected away from the openings, which are also referred to as pre-chamber nozzles.

In order to ensure sufficiently low residual gas content in the area of the spark plug gap with conventional pre-chamber spark plugs, a long electrode that projects deep into the pre-chamber must be used. This results in a fissured surface in the pre-chamber and a large damage volume. The previously mentioned problems and disadvantages can be avoided with the pre-chamber spark plug according to the invention.

The combustion in the pre-chamber is stabilized and improved by the tumble flow. This enlarges the working region of the pre-chamber, such that a more stable ignition can be realized when idling and a lower risk of pre-ignition at full load. Furthermore, the improved combustion results in a greater pressure rise in the pre-chamber and consequently a deeper flare penetration depth into the combustion chamber. This also improves combustion in the combustion chamber, which is also referred to as the main combustion chamber. The flare penetration depth is understood to be a distance, path or depth that the respective flare penetrates into the pre-chamber. As previously described, the respective flare results from the mixture being ignited and subsequently combusted in the pre-chamber.

Further knowledge underlying the invention is that pre-chamber spark plugs can be differentiated according to the flow structure in the pre-chamber. For example, a distinction can be made between structureless (chaotic) flow forms in the pre-chamber and rotationally symmetrical flow forms, in particular according to the prior art. The flow structure is determined by the corresponding arrangement and design of the openings. For rotationally symmetrical flow structures according to the prior art, the arrangement or design of the openings is rotationally symmetrical around the aforementioned axis, which is, for example, one or the main axis of the pre-chamber. In contrast to such a rotationally symmetrical design of the openings, a rotationally asymmetrical design of the openings with respect to the axis is provided according to the invention, such that the tumble-shaped flow of the mixture is effected or can be effected.

In order to be able to realize particularly advantageous flow conditions in the pre-chamber and thus particularly good operation, it is provided in one embodiment of the invention that the axis runs in the longitudinal direction of the pre-chamber. In other words, the axis and thus the plane on which the axis runs run in parallel to the longitudinal direction of the pre-chamber or coincide with the longitudinal direction of the pre-chamber.

A further embodiment is characterized in that the pre-chamber is rotationally symmetrical with respect to the axis, whereby particularly advantageous flow conditions and thus particularly advantageous operation can be ensured.

A further embodiment is characterized in that the or all flow cross-sections of the openings arranged in the first half are larger than the or all flow cross-sections of the openings arranged in the second half. This ensures particularly advantageous flow conditions and thus particularly advantageous operation.

In a particularly advantageous embodiment of the invention, it is provided that a or the number of the or all openings arranged in the first half is greater than a or the number of the or all openings arranged in the second half. In this way, an advantageously tumble-shaped flow can be realized in a particularly advantageous manner, such that particularly advantageous operation can be realized.

In order to be able to implement a particularly advantageous operation in a particularly simple and safe manner, it is provided in a further embodiment of the invention that the or all openings are circular in shape, such that the openings have a respective diameter. In particular, it is provided that the or all flow cross-sections are each circular and thus have a respective diameter. It is preferably provided that the or all diameters of the openings arranged in the first half are larger than the or all diameters of the openings arranged in the second half.

Finally, it has been shown to be particularly advantageous when the mean value of the flow cross-sections of the openings arranged in the first half is greater than the mean value of the flow cross-sections of the openings arranged in the second half. The mean value is preferably the arithmetic mean value, also referred to as the arithmetic mean, which is obtained, for example, by dividing, i.e., splitting, the sum of the flow cross-sections of the openings arranged in the respective half by the number of openings arranged in the respective half.

A second aspect of the invention relates to an internal combustion engine, preferably in the form of a reciprocating piston engine, for a motor vehicle, which may preferably be in the form of a motor car and very preferably in the form of a passenger car or a commercial vehicle. The internal combustion engine has at least one combustion chamber. The combustion chamber is, for example, partially delimited by a cylinder and by a piston of the internal combustion engine which is arranged in the cylinder, such that it can move in translation, wherein the cylinder is formed or delimited, for example, by an engine housing of the internal combustion engine which is formed in particular as a crankcase or cylinder crankcase. In addition, the combustion chamber is, for example, partially delimited by a combustion chamber roof, which is formed, for example, by a cylinder head formed separately from the engine housing and connected to the engine housing. The internal combustion engine further comprises at least one pre-chamber spark plug associated with the combustion chamber, for example at least partially arranged in the combustion chamber. The pre-chamber spark plug comprises a pre-chamber with a plurality of openings via which the pre-chamber is fluidically connected to the combustion chamber, also referred to as the main combustion chamber. A fuel-air mixture, also referred to simply as a mixture, can be introduced or flow into the pre-chamber from the combustion chamber via the openings. In other words, for example, the aforementioned fuel-air mixture is formed in the combustion chamber or the fuel-air mixture is introduced into the combustion chamber. For example, fuel, in particular liquid fuel, and air are introduced into the combustion chamber. For example, the fuel is injected directly into the combustion chamber. The aforementioned mixture comprises the air and the fuel that are introduced into the combustion chamber. At least part of the mixture from the combustion chamber can flow through the openings and thus enter the pre-chamber via the openings. In the pre-chamber, the portion of the mixture can be ignited and burned, resulting in the flares described previously. The flares can then flow out of the pre-chamber via the openings and flow into the main combustion chamber, where they ignite the remaining mixture. The respective opening has a respective flow cross-section through which the mixture or the respective flare can flow.

In order to now be able to realize a particularly advantageous operation, it is provided according to the invention that the sum of the flow cross-sections of the openings arranged in a first of the halves is greater than the sum of the flow cross-sections of the openings arranged in the second half with respect to an imaginary plane running along an imaginary axis and dividing the pre-chamber into two halves of equal size. In this case, the openings are rotationally asymmetrical around the axis. Advantages and advantageous embodiments of the first aspect of the invention are to be regarded as advantages and advantageous embodiments of the second aspect, and vice versa. Furthermore, it is provided according to the invention that the flow cross-sections of at least two of the openings differ from each other with respect to their shape.

In order to be able to realize a particularly advantageous operation of the internal combustion engine, it is provided in one embodiment of the second aspect of the invention that the internal combustion engine is formed as a reciprocating piston engine.

A third aspect of the invention relates to a motor vehicle, preferably in the form of a motor car, which has an internal combustion engine according to the invention in accordance with the second aspect of the invention. Here, the motor vehicle can be driven by means of the internal combustion engine. Advantages and advantageous embodiments of the first and second aspects of the invention are to be regarded as advantages and advantageous embodiments of the third aspect of the invention, and vice versa.

Further advantages, features and details of the invention emerge from the following description of a preferred exemplary embodiment and from the drawings. The features and combinations of features mentioned above in the description, as well as the features and combinations of features mentioned below in the description of the figures and/or shown alone in the figures, can be used not only in the combination indicated in each case, but also in other combinations or on their own, without leaving from the scope of the invention.

DETAILED DESCRIPTION OF THE DRAWINGS

Figure 1:
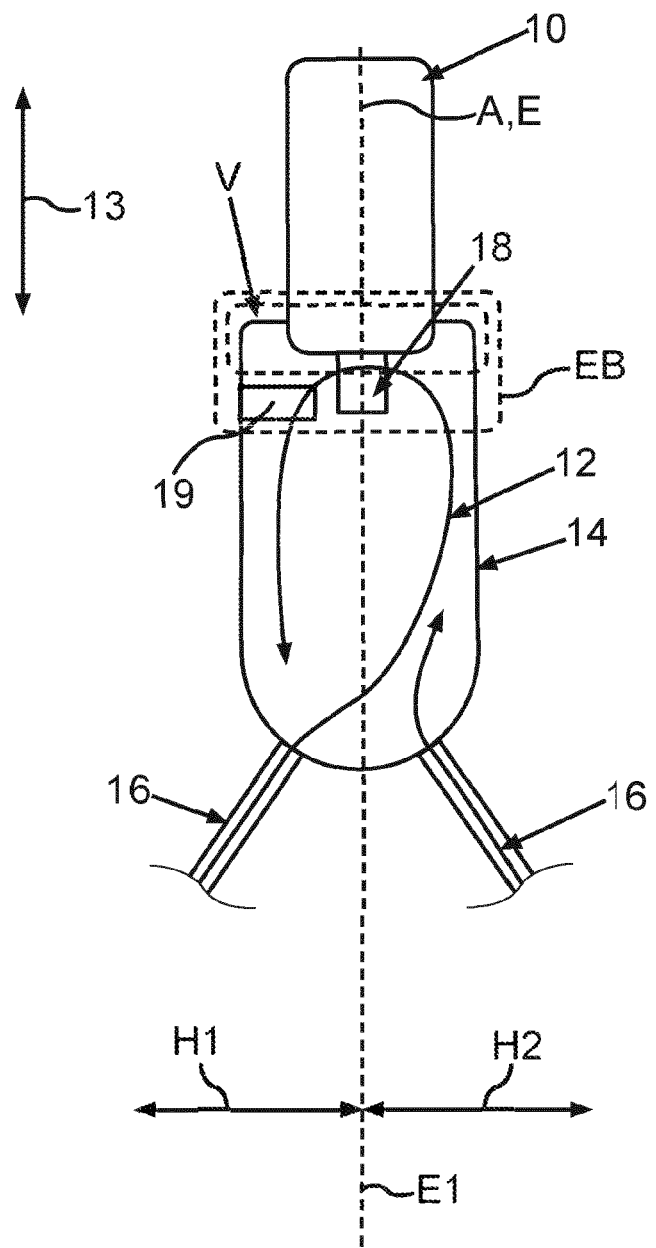
FIG. 1 is a schematic and sectional side view of a pre-chamber spark plug according to the invention for a combustion chamber of an internal combustion engine of a motor vehicle.

In the figures the same or functionally identical elements are provided with the same reference numerals.

Figure 2:
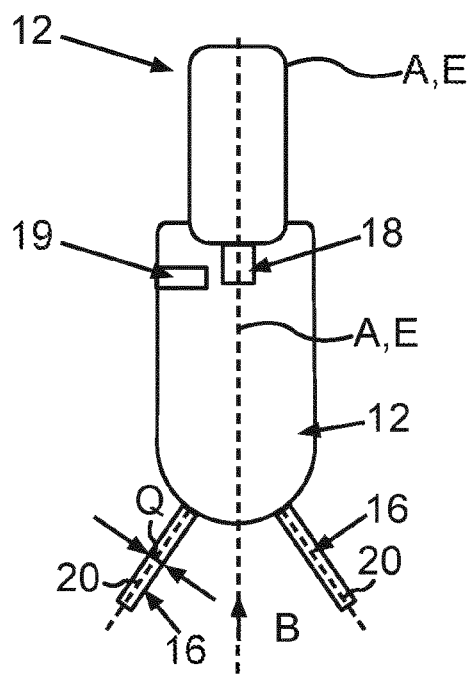
FIG. 2 is a further schematic and sectional side view of the pre-chamber spark plug.

FIGS. 1 and 2 respectively show a schematic and sectional side view of a pre-chamber spark plug 10 for a combustion chamber, formed for example by a cylinder or formed as a cylinder or delimited by a cylinder, of an internal combustion engine, formed for example as a reciprocating piston engine, of a motor vehicle, in particular a motor car, such as for example a passenger car or commercial vehicle. The motor vehicle can be driven by means of the internal combustion engine. The pre-chamber spark plug 10 has at least or exactly one pre-chamber 12, the contour of which is labelled with 14 in FIG. 1. The pre-chamber 12 has a plurality of openings 16, also referred to as nozzles and formed as through-openings, via which the pre-chamber 12 can be or is fluidically connected to the combustion chamber. In its fully produced state, the internal combustion engine has the aforementioned combustion chamber and the pre-chamber spark plug 10, such that in the fully produced state of the internal combustion engine, the pre-chamber 12 is fluidically connected to the combustion chamber via the openings 16. This allows a fuel-air mixture from the combustion chamber to flow at least partially through the openings 16 and thereby into the pre-chamber 12, such that at least part of the fuel-air mixture, which is simply also referred to as a mixture, from the combustion chamber can flow through the openings 16 and thus can or does flow into the pre-chamber 12 via the openings 16.

Here, the pre-chamber spark plug 10 has at least one or more electrodes, wherein one of the electrodes of the pre-chamber spark plug 10, labelled with 18, can be seen in FIG. 1. The electrode 18 is, for example, a center electrode and is arranged at least partially in the pre-chamber 12. The pre-chamber spark plug 10 also has a second electrode 19, which is, for example, a mass electrode and is arranged at least partially in the pre-chamber 12. By means of the electrodes 18 and 19, at least one ignition spark can be generated in the pre-chamber 12, in particular within a respective operating cycle of the internal combustion engine. By means of the ignition spark, the mixture which has flowed into the pre-chamber 12 and is consequently received in the pre-chamber 12 can be ignited. In doing so, the electrodes 18 and 19 delimit an ignition location for the ignition spark. For example, the ignition spark is generated at or in the ignition location. In other words, the electrodes 18 and 19 can be used to generate or provide the ignition spark at the ignition location in the pre-chamber 12. By igniting the mixture in the pre-chamber 12, the mixture in the pre-chamber 12 is burnt. This results in burning flares which flow through the openings 16 and can thus flow out of the pre-chamber 12 into the combustion chamber via the openings 16. This ignites, for example, the remaining mixture remaining in the combustion chamber.

As can be seen from the example of one of the openings 16 in FIG. 2, the respective opening 16 or all openings 16 have a respective flow cross-section Q through which the mixture or the respective flare can flow. The flow cross-section Q is a surface or has a surface or an area, wherein the surface can be flowed through by the mixture or by the flare.

It can be seen from FIGS. 1 and 2 that an imaginary plane E runs along an axis A, which runs on the plane E. The axis A and thus the plane E run in the longitudinal direction of the pre-chamber 12 and thus of the pre-chamber spark plug 12, wherein the longitudinal direction is illustrated by a double arrow 13. In other words, the axes A and the plane E run in parallel to the longitudinal extension direction of the pre-chamber 12, or the longitudinal extension direction of the pre-chamber 12 coincides with the axis A and with the plane E, respectively. The imaginary plane E divides the pre-chamber 12 into exactly two equal halves H1 and H2. The first of the openings 16, labelled with B1, is now arranged in the first half H1, and the second of the openings 16, labelled with B2, is arranged in the second half H2.

In order to now be able to realize a particularly advantageous operation of the pre-chamber spark plug 10 and thus of the internal combustion engine as a whole, the sum of the flow cross-sections Q of the first openings B1 arranged in the first half H1 is greater than the sum of the flow cross-sections Q of the second openings B2 arranged in the second half H2.

Figure 3:
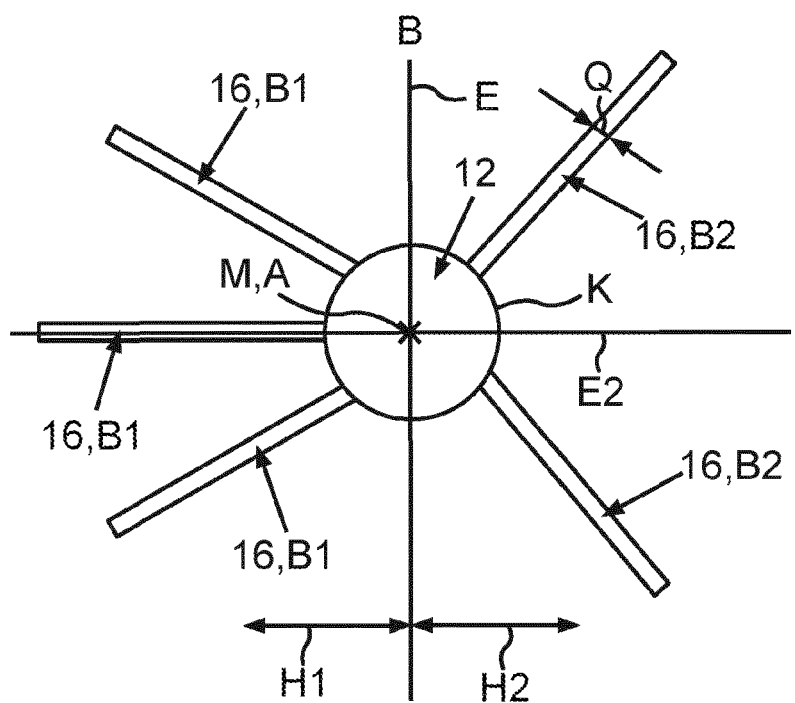
FIG. 3 is a schematic view of the pre-chamber spark plug in a viewing direction labelled in FIG. 2 with B.

As can be seen particularly well in FIG. 3, the or all openings 16 of the pre-chamber 12, for example, are arranged along an imaginary circle K whose center M lies on the imaginary axis A. The plane E thereby divides, for example, the imaginary circle K into exactly two halves of the circle of equal size, wherein, for example, a first of the halves of the circle is arranged, in particular completely, in the first half H1, and the second half of the circle is arranged, for example, in particular completely, in the second half H2. It is conceivable that the sum of the flow cross-sections Q of the first openings B1 arranged on the first half of the circle is greater than the sum of the flow cross-sections Q of the second openings B2 arranged on the second half of the circle.

In the exemplary embodiment shown in the figures, the axis A runs in the longitudinal direction of the pre-chamber 12, wherein the axis A is a or the main axis of the pre-chamber 12, also referred to as the longitudinal axis or longitudinal center axis. Preferably, the pre-chamber 12 is formed to be rotationally symmetrical with respect to the axis A.

In the exemplary embodiment shown in the figures, a number of the openings B1 arranged on or in the first half H1 is greater than a number of the openings B2 arranged on or in the second half H2. Here, the number of openings B1 is three, while the number of openings B2 is two. Furthermore, it is preferably provided that all flow cross sections Q of all openings B1 are larger than all flow cross sections Q of all openings B2. It is also preferably provided that the mean value of the flow cross-sections Q of the openings B1 is greater than the mean value of the flow cross-sections Q of the openings B2. In other words, it is preferably provided that the mean cross-section of the openings B1 is greater than the mean cross-section of the openings B2. In the exemplary embodiment shown in the figures, the or all openings are circular, such that the or all openings have a respective diameter. The or all diameters of the openings B1 are larger than the or all diameters of the openings B2.

In particular, it is provided that the number and the diameters of the openings B1 are larger than the number and the diameters of the opening B2. The respective opening 16 is formed as a bore. In addition, the respective opening 16 runs straight or rectilinear over its entire extension. Due to the described design of the openings 16, the openings 16 are formed to cause a tumble-shaped flow of the mixture flowing into the pre-chamber 12 via the openings 16, as shown by arrows in FIG. 1 and also referred to as a roller-shaped flow or roller flow. In particular, the arrows shown in FIG. 1 illustrate a contour of the tumble-shaped flow, also referred to as a flow contour.

The axis A, which in this case is the main axis, runs on a plane, also referred to as the roller plane, around whose plane normal the tumble flow runs. For example, the plane marked E is perpendicular to this roller plane. Due to the tumble-shaped flow, a volume V of the pre-chamber 12, also referred to as the damage volume, can be kept particularly low, such that a particularly large operating range of the pre-chamber spark plug 10 can be ensured. In FIG. 2, respective axes of the respective openings 16 are marked with 20. For example, the respective opening 16 is rotationally symmetrical with respect to its respective axis 20 and is thereby circular, for example, such that the respective axis 20 runs in the longitudinal direction of the respective opening 16, for example. The respective axis 20 coincides with a passage direction in which the mixture from the combustion chamber can flow through the respective opening 16 and thus flow into the pre-chamber 12. Furthermore, the respective flare resulting from the ignition of the portion of the mixture in the pre-chamber 12 can flow through the respective opening 16 and thus flow from the pre-chamber 12 into the combustion chamber. In particular, when the openings 16 are, for example, formed as or by cylindrical bores, the respective flow cross-section Q of the respective bore, also referred to as the cross-section, can be characterized by its diameter. In particular, it can be seen from FIG. 3 that the openings 16 are formed rotationally asymmetrically around the axis A and are here arranged in particular such that the openings are arranged unevenly distributed around the axis A in particular. The tumble-shaped flow is thus caused, for example, by the different flow cross-sections Q and/or by a particularly different distribution of the openings 16 around the axis A and/or by the corresponding number of openings 16.

The pre-chamber 12 can be divided into four quadrants by the plane E and a second plane E2. The planes E and E2 are perpendicular to each other, and the planes E and E2 intersect in the axis A, which thus runs on both planes E and E2. Furthermore, an electrode region EB can be seen, in which the electrodes 18 and 19, in particular their free ends, are arranged in the pre-chamber 12. Preferably, the plane E2 is the aforementioned roller plane.

The tumble flow has a flow center that is orthogonal to the main axis (axis A) of the pre-chamber 12. The flow center is a roller axis around which the tumble flow runs in a roller shape. According to FIG. 3, the roller axis, also referred to as the tumble flow axis, is orthogonal to the plane E2 and runs, for example, on the plane E. In other words, the tumble flow can be defined as a flow structure in which the flow flows in the half H2 from the holes towards the electrode region EB, which is also referred to as upward flow, then flows through the electrode region EB and flows in the first half H1 from the electrode region EB towards the holes, which is referred to as downward flow. This makes the tumble flow a structured flow form, which is, however, not rotationally symmetrical around the main axis, also called the pre-chamber main axis.

LIST OF REFERENCE CHARACTERS

10 Pre-chamber spark plug
12 Pre-chamber
13 Double arrow
14 Contour
16 Opening
18 Electrode
19 Electrode
20 Axis
A Axis
B Viewing direction
B1 Opening
B2 Opening
E Plane
EB Electrode region
E2 Plane
H1 First half
H2 Second half
M Central point
Q Flow cross-section

The invention claimed is:

1. A pre-chamber spark plug (10) for a combustion chamber of an internal combustion engine, comprising:
a pre-chamber (12) which has a plurality of openings (16, B1, B2) and which is fluidically connectable to the combustion chamber via the plurality of openings (16, B1, B2), wherein a fuel/air mixture is introducible from the combustion chamber into the pre-chamber (12) via the plurality of openings (16, B1, B2) and wherein each of the plurality of openings (16, B1, B2) has a respective flow cross section through which the fuel/air mixture is flowable;
wherein, with respect to an imaginary plane (E1) running along an imaginary axis (A) of the pre-chamber (12) and dividing the pre-chamber (12) into a first half (H1) and a second half (H2) of equal size, a sum of the flow cross sections of first openings (B1) of the plurality of openings (16, B1, B2) disposed in the first half (H1) is greater than a sum of the flow cross-sections of second openings (B2) of the plurality of openings (16, B1, B2) disposed in the second half (H2);
wherein the plurality of openings (16, B1, B2) are configured rotationally asymmetrically around the imaginary axis (A) such that all of the plurality of openings (16, B1, B2) follow one another in a non-uniform or disordered manner which is not a regular order;
wherein the sum of the flow cross sections of the first openings (B1) of the plurality of openings (16, B1, B2) being greater than the sum of the flow cross-sections of second openings (B2) of the plurality of openings (16, B1, B2) and the rotationally asymmetrical configuration of the plurality of openings (16, B1, B2) cause a tumble-shaped flow in the pre-chamber (12) of a fuel/air mixture that is introduced from the combustion chamber into the pre-chamber (12) via the plurality of openings (16, B1, B2); and
wherein the flow cross-sections of at least two of the plurality of openings (16, B1, B2) differ from one another with regard to a respective shape.

2. The pre-chamber spark (10) according to claim 1, wherein the axis (A) runs in a longitudinal extension direction of the pre-chamber (12).

3. The pre-chamber spark (10) according to claim 1, wherein the pre-chamber (12) is formed rotationally symmetrically with respect to the axis (A).

4. The pre-chamber spark (10) according to claim 1, wherein the flow cross-sections of the first openings (B1) disposed in the first half (H1) are larger than the flow cross-sections of the second openings (B2) disposed in the second half (H2).

5. The pre-chamber spark plug (10) according to claim 1, wherein a number of the first openings (B1) disposed in the first half (H1) is greater than a number of the second openings (B2) disposed in the second half (H2).

6. The pre-chamber spark plug (10) according to claim 1, wherein the plurality of openings (16, B1, B2) are formed to be circular such that the plurality of openings (16, B1, B2) have a respective diameter and wherein the diameters of the first openings (B1) disposed in the first half (H1) are larger than the diameters of the second openings (B2) disposed in the second half (H2).

7. The pre-chamber spark plug (10) according to claim 1, wherein a mean value of the flow cross-sections of the first openings (B1) disposed in the first half (H1) is greater than a mean value of the flow cross-sections of the second openings (B2) disposed in the second half (H2).

8. An internal combustion engine for a motor vehicle, comprising:
a combustion chamber; and
the pre-chamber spark plug (10) according to claim 1.

9. The internal combustion engine according to claim 8, wherein the internal combustion engine is a reciprocating piston engine.

10. A motor vehicle, comprising:
an internal combustion engine with a combustion chamber; and
the pre-chamber spark plug (10) according to claim 1.

* * * * *